United States Patent
Guo

(10) Patent No.: US 12,425,501 B2
(45) Date of Patent: Sep. 23, 2025

(54) SUPPORT APPARATUS AND FOLDABLE DISPLAY TERMINAL

(71) Applicant: Honor Device Co., Ltd., Shenzhen (CN)

(72) Inventor: Renwei Guo, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/246,240

(22) PCT Filed: Aug. 25, 2022

(86) PCT No.: PCT/CN2022/114813
§ 371 (c)(1),
(2) Date: Mar. 22, 2023

(87) PCT Pub. No.: WO2023/071475
PCT Pub. Date: May 4, 2023

(65) Prior Publication Data
US 2024/0129387 A1    Apr. 18, 2024

(30) Foreign Application Priority Data

Oct. 26, 2021    (CN) .......................... 202111250570.2

(51) Int. Cl.
*H04M 1/02* (2006.01)
(52) U.S. Cl.
CPC ....... *H04M 1/0216* (2013.01); *H04M 1/0268* (2013.01); *H04M 2201/38* (2013.01)

(58) Field of Classification Search
CPC ........... H04W 52/0229; H04W 68/005; H04W 76/28; H04W 4/90; H04W 76/50; H04B 7/0695; Y02D 30/70
See application file for complete search history.

(56) References Cited

U.S. PATENT DOCUMENTS

| 2020/0304613 A1 | 9/2020 | Cha et al. |
| 2024/0028085 A1* | 1/2024 | Jiang ..................... G06F 1/1681 |

FOREIGN PATENT DOCUMENTS

| CN | 106713542 A | 5/2017 | |
| CN | 207075032 | * 3/2018 | .............. H04M 1/02 |
| CN | 207075032 U | 3/2018 | |
| CN | 110197624 A | 9/2019 | |
| CN | 110267475 A | 9/2019 | |

(Continued)

*Primary Examiner* — Matthew D. Anderson
(74) *Attorney, Agent, or Firm* — Conley Rose, P.C.

(57) ABSTRACT

A support apparatus and a foldable display terminal, which relate to the field of foldable display terminal technologies. The support apparatus includes a rotating mechanism, a first support portion, and a second support portion, where the first support portion includes a first support member, a first elastic member, and a first base plate, the first elastic member is connected between the first base plate and the first support member, and the first elastic member is elastically deformable to enable the first base plate to move in a direction close to or away from the rotating mechanism with respect to the first support member; and the second support portion and the first support portion are respectively disposed on two sides of the rotating mechanism, and the second support portion and the first support portion may be folded or unfolded opposite to each other.

20 Claims, 13 Drawing Sheets

(56) References Cited

FOREIGN PATENT DOCUMENTS

| | | | | |
|---|---|---|---|---|
| CN | 209767998 U | 12/2019 | | |
| CN | 111090361 A | 5/2020 | | |
| CN | 111107189 A | 5/2020 | | |
| CN | 111968513 | * 11/2020 | ............ | G09F 9/301 |
| CN | 111968513 A | 11/2020 | | |
| CN | 212935953 U | 4/2021 | | |
| CN | 113014702 A | 6/2021 | | |
| CN | 214068192 U | 8/2021 | | |
| KR | 20200011100 A | * 2/2020 | ............... | G06F 1/16 |

* cited by examiner

SUPPORT APPARATUS AND FOLDABLE DISPLAY TERMINAL

CROSS-REFERENCE TO RELATED APPLICATIONS

This application is a U.S. National Stage of International Application No. PCT/CN2022/114813 filed on Aug. 25, 2022, which claims priority to Chinese Patent Application No. 202111250570.2, filed with the China National Intellectual Property Administration on Oct. 26, 2021, both of which are incorporated herein by reference in their entireties.

TECHNICAL FIELD

This application relates to the field of foldable display terminal technologies, and in particular, to a support apparatus and a foldable display terminal.

BACKGROUND

As fast-growing mobile terminal devices, terminals such as smartphones are fully reflected in the latest technological innovations and technological iterations. Currently, when people are pursuing portability of terminals, they also hope that displays of the terminals are large enough. Therefore foldable display terminals emerge.

However, when a foldable display terminal is folded or unfolded, a bending stress is applied to a bendable or foldable display. During repeated folding and unfolding, a bendable part of the foldable display may be easily damaged due to repeated compression and stretching.

SUMMARY

This application provides a support apparatus and a foldable display terminal, to reduce a stress on a foldable display during folding, so as to prolong the service life of the foldable display terminal.

To achieve the foregoing objective, the following technical solutions are used in embodiments of this application:

According to a first aspect, this application provides a support apparatus, including: a rotating mechanism, a first support portion, and a second support portion, where the first support portion includes a first support member, a first elastic member, and a first base plate, the first elastic member is connected between the first base plate and the first support member, and the first elastic member is elastically deformable to enable the first base plate to move in a direction close to or away from the rotating mechanism with respect to the first support member; and the second support portion and the first support portion are respectively disposed on two sides of the rotating mechanism, and the second support portion and the first support portion may be folded or unfolded opposite to each other.

According to the support apparatus provided in this application, the elastically deformable first elastic member is disposed between the first base plate and the first support member, so that relative movement between the first base plate and the first support member in a direction close to or away from the rotating mechanism can be implemented when the foldable display terminal is folded or unfolded, so as to provide a sliding space to the foldable display when the foldable display terminal is folded or unfolded. This reduces a stress on the foldable display during folding, and reduces relative displacement among layers of the foldable display, so that deformation of a bendable part of the foldable display due to repeated folding or unfolding may be avoided, thereby prolonging the service life of the foldable display.

In a possible design of the first aspect, the first elastic member is formed into a strip, and a length direction of the first elastic member is parallel to a rotation axis of the first support member. In this way, during folding of the foldable display terminal, the first elastic member is prone to elastic deformation, and stress uniformity of the first base plate may be guaranteed. In addition, a quantity of the first elastic member may be small to reduce installation complexity.

In a possible design of the first aspect, two ends, in a length direction, of the first elastic member extend respectively to be flush with two ends of the first base plate. In this way, the stress uniformity of the first base plate may be further improved.

In a possible design of the first aspect, a quantity of the first elastic member is more than one, each first elastic member is connected to the first base plate, and the plurality of first elastic members are spaced in a first direction, where the first direction is perpendicular to an extending direction of the rotation axis of the first support member. In this way, stress uniformity that is of the first base plate and that is in the first direction may be guaranteed.

In a possible design of the first aspect, the first support portion further includes: a first stop portion, where the first stop portion is disposed on a side surface that is of the first base plate and that faces the first support member, and at least a part of the first stop portion is located on one side that is of the first elastic member and that is close to the rotating mechanism. In this way, during folding of the foldable display terminal, one end that is of the first stop portion and that is close to the first elastic member is abutted against and cooperates with a side wall that is of the first elastic member and that is close to the rotating mechanism, to limit an inclination angle and a deformation amount of the first elastic member, so that the deformation amount of the first elastic member may be adjusted by the first stop portion to avoid excessive deformation of the first elastic member, thereby improving reliability of the support apparatus.

In a possible design of the first aspect, the first elastic member is connected to one end that is of the first stop portion and that is away from the rotating mechanism. The structure is simple, and processing is easy. In addition, during folding of the foldable display terminal, a stop effect of the first stop portion on the first elastic member can be easily achieved.

In a possible design of the first aspect, the first elastic member is spaced apart from the first stop portion. A spacing between the first stop portion and the first elastic member is less than a spacing between the first base plate and the first support member. That is, the spacing between the first stop portion and the first elastic member is less than a thickness of the first elastic member. In this way, during folding of the foldable display terminal, the first stop portion may also be abutted against the side wall that is of the first elastic member and that is close to the rotating mechanism, to limit an inclination angle and a deformation amount of the first elastic member, so that the deformation amount of the first elastic member may be adjusted by the first stop portion to avoid excessive deformation of the first elastic member, thereby improving reliability of the support apparatus.

In a possible design of the first aspect, the first elastic member and the first stop portion are in an integrated structure. Therefore, the processing technology for the first support portion may be simplified to improve the processing efficiency.

In a possible design of the first aspect, the first stop portion and the first base plate are in an integrated structure. Therefore, the processing technology for the first support portion may be simplified to improve the processing efficiency.

In a possible design of the first aspect, an elastic modulus of the first stop portion is greater than that of the first elastic member. In this way, the stop effect of the first stop portion may be improved.

In a possible design of the first aspect, the support apparatus further includes a second stop portion, the second stop portion is connected to a side surface that is of the first support member and that faces the first base plate, and at least a part of the second stop portion is located on one side that is of the first elastic member and that is away from the rotating mechanism. During folding of the foldable display terminal, one end that is of the first stop portion and that is close to the first elastic member is abutted against a side wall that is of the first elastic member and that is close to the rotating mechanism, and one end that is of the second stop portion and that is close to the first elastic member is abutted against a side wall that is of the first elastic member and that is away from the rotating mechanism. Therefore, an inclination angle and a deformation amount of the first elastic member may be limited by the first stop portion and the second stop portion, so that the deformation amount of the first elastic member may be adjusted to avoid excessive deformation of the first elastic member, thereby improving the reliability of the support apparatus.

In a possible design of the first aspect, the first elastic member is connected to one end that is of the second stop portion and that is close to the rotating mechanism. The first stop portion, the second stop portion and the first elastic member generally form a "Z" shape. The structure is simple, and processing is easy. In addition, a stop effect of the first stop portion and the second stop portion on the first elastic member can be easily achieved.

In a possible design of the first aspect, the first elastic member is spaced apart from the second stop portion.

In a possible design of the first aspect, the first elastic member and the second stop portion are in an integrated structure. Therefore, the processing technology for the first support portion may be simplified to improve the processing efficiency.

In a possible design of the first aspect, a width of the first elastic member remains unchanged or gradually decreases in a direction from the first base plate to the first support member. The structure is simple, and processing is easy.

In a possible design of the first aspect, the first elastic member is a rubber member or a silicone member.

In a possible design of the first aspect, the second support portion includes, a second support member, a second base plate, and a second elastic member, where the second support member is rotatably connected to the rotating mechanism; the second base plate is laminated with the second support member; and the second elastic member is connected between the first base plate and the first support member, and the second elastic member is elastically deformable to enable the second base plate and the second support member to move relative to each other. In this way, the elastically deformable second elastic member is disposed between the second base plate and the second support member, so that when the foldable display terminal is folded or unfolded, the foldable display can be driven by the second base plate to slide with respect to the second support member, thereby reducing a stress on the foldable display during folding or unfolding, and reducing relative displacement among layers of the foldable display. Therefore, deformation of a bendable part of the foldable display due to repeated folding or unfolding may be avoided, which prolongs the service life of the foldable display.

In a possible design of the first aspect, the second support portion includes a second support member, and the second support member is rotatably connected to the rotating mechanism.

According to a second aspect, this application provides a foldable display terminal, including: a foldable display and a support apparatus, where the foldable display includes a first part, a second part, and a bendable part between the first part and the second part; and the support apparatus is the support apparatus in any one of the foregoing technical solutions, the first support portion is configured to support the first part and the second support portion is configured to support the second part.

Because the foldable display terminal provided in embodiments of this application includes the support apparatus in the foregoing technical solutions, both the foldable display terminal and the support apparatus can resolve the same technical problem and achieve the same effect.

BRIEF DESCRIPTION OF DRAWINGS

FIG. 12 is a schematic diagram of a structure of a first support portion in the support apparatus shown in FIG. 11a;

FIG. 13b is a schematic diagram of a structure of a first support portion in the foldable display terminal shown in FIG. 13a;

FIG. 18 is a schematic diagram of an assembly structure of the first base plate, the first elastic member, the first stop portion, and the second stop portion shown in FIG. 17a;

REFERENCE SIGNS IN THE DRAWINGS

100. Foldable display terminal;
10. Foldable display; 11. First part. 12. Second part; 13. Bendable part; 101. Substrate; 102. Display; 103. Polarizer; 104. Protective layer;
20. Support apparatus; 21. First housing; 211. First middle frame; 212. First back cover; 22. Second housing; 221. Second middle frame; 222. Second back cover;
201. First support portion; 2011. First support member; 2012. First base plate; 2012a. Third end; 2012b. Fourth end; 2013. First elastic member; 2013a. First end; 2013b. Second end; 2014. First stop portion; 2015. Second stop portion;
202. Second support portion; 2021. Second support member; 2022. Second base plate; 2023. Second elastic member;
23. Rotating mechanism; 231. Base; 232. First oscillating arm; 233. Second oscillating arm;
30. Adhesive.

DESCRIPTION OF EMBODIMENTS

In embodiments of this application, the terms "first", "second". "third" and "fourth" are used for descriptive purposes only, and cannot be construed as indicating or implying relative importance or implicitly indicating a quantity of indicated technical features. Therefore, features defined with "first", "second", "third" and "fourth" may explicitly or implicitly include one or more of the features.

In embodiments of this application, the term "including", "containing" or any other variant thereof is intended to cover non-exclusive inclusion, so that a process, method, article or apparatus including a series of elements includes not only those elements, but also other elements not explicitly listed, or elements inherent to such a process, method, article or apparatus. Without further limitation, the element defined by the sentence "including a . . . " does not exclude that other identical elements are also present in the process, method, article or apparatus including the element.

In embodiments of this application, the term "and/or" is only used to describe an association relationship between associated objects, and indicates that three relationships may exist. For example, A and/or B may indicate the following: Only A exists, both A and B exist, and only B exists. In addition, the symbol "/" used herein generally represents an "or" relationship between associated objects.

This application provides a foldable display terminal, and the foldable display terminal is a type of terminal device with a foldable display. Specifically, the foldable display terminal includes, but is not limited to, a mobile phone. That is, the foldable display terminal may also be another type of terminal device with a foldable display.

Figure 1:
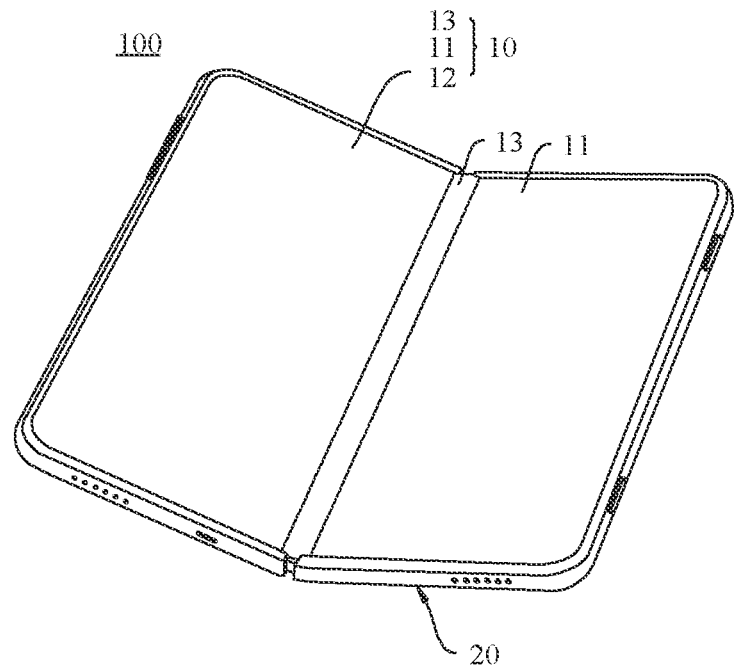
FIG. 1 is a perspective view of a foldable display terminal according to some embodiments of this application.

Referring to FIG. 1, FIG. 1 is a perspective view of a foldable display terminal 100 according to some embodiments of this application. In this embodiment, that the foldable display terminal 100 is a foldable display phone is used as an example for description. The foldable display terminal 100 includes a foldable display 10 and a support apparatus 20.

It may be understood that FIG. 1 only shows an example of some components included in the foldable display terminal 100, and actual shapes, sizes, locations, and structures of these components are not limited by FIG. 1.

The foldable display 10 is configured to display images, videos, and the like. The foldable display 10 may be folded into a first part 11 and a second part 12. The foldable display 10 further includes a bendable part 13 between the first part 11 and the second part 12. At least the bendable part 13 of the foldable display 10 is made of a flexible material. The first part 11 and the second part 12 may be made of a flexible material, or a rigid material, or partially made of a rigid material and partially made of a flexible material. This is not specifically limited herein.

Specifically, the foldable display 10 may be an organic light-emitting diode (organic light-emitting diode, OLED) screen, a micro organic light-emitting diode (micro organic light-emitting diode) screen, a quantum dot light emitting diode (quantum dot light emitting diode, QLED) screen, a liquid crystal display (liquid crystal display, LCD), and the like.

Figure 2:
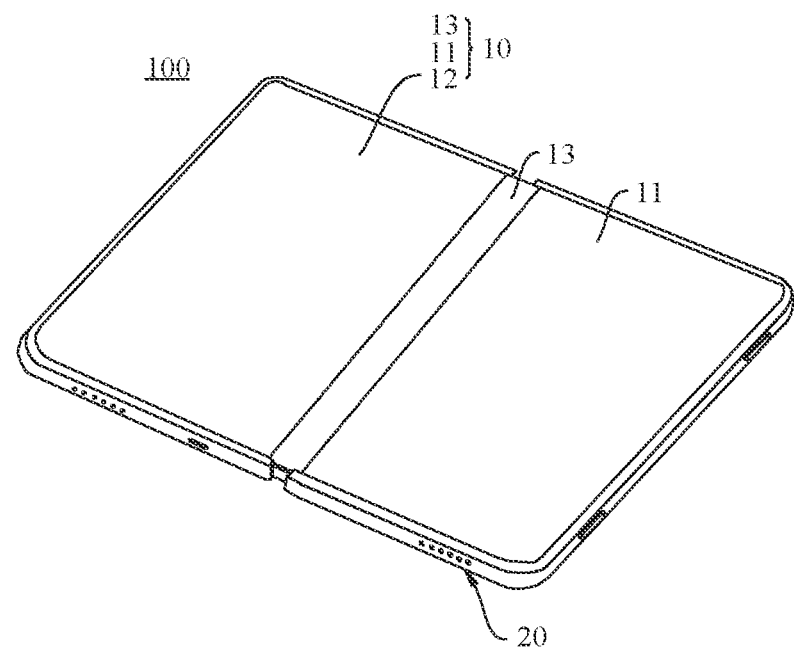
FIG. 2 is a schematic diagram of a structure of the foldable display terminal shown in FIG. 1 in an unfolded state.

The foldable display 10 can be folded between an unfolded state and a folded state. Referring to FIG. 2, FIG. 2 is a schematic diagram of a structure of the foldable display terminal 100 shown in FIG. 1 when the foldable display 10 is in an unfolded state. When the foldable display 10 is in the unfolded state, the first part 11, the second part 12 and the bendable part 13 are coplanarly disposed and face the same direction. In this state, large-screen display can be implemented, so as to provide a user with more abundant information and better user experience.

Figure 3:
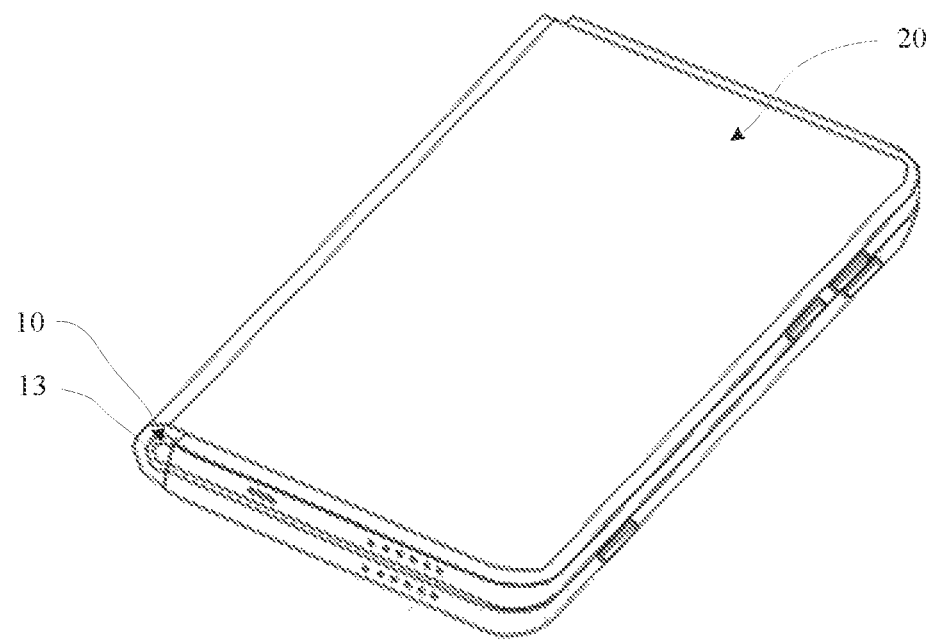
FIG. 3 is a schematic diagram of a structure of the foldable display terminal shown in FIG. 1 in a folded state.

Referring to FIG. 3, FIG. 3 is a schematic diagram of a structure of the foldable display terminal 100 shown in FIG. 1 when the foldable display 10 is in a folded state. When the foldable display 10 is in the folded state, the bendable part 13 is in a bent state, and the first part 11 (not shown in FIG. 3) is opposite to the second part 12 (not shown in FIG. 3). The foldable display 10 is invisible to a user, and the support apparatus 20 is disposed outside the foldable display 10 for protection, to prevent the foldable display 10 from being scratched by hard objects. Such a foldable display phone is a phone with an inward foldable display. In other embodiments, when the foldable display 10 is in a folded state, the first part 11 and the second part 12 may also depart from each other and be exposed. Such a foldable display phone is a phone with an outward foldable display.

Figure 4:
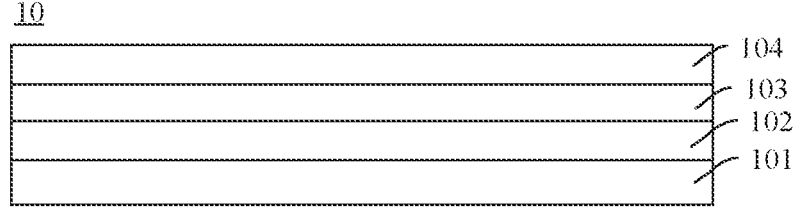
FIG. 4 is a sectional view of a foldable display in the foldable display terminal shown in FIG. 1.

In some embodiments, referring to FIG. 4, FIG. 4 is a sectional view of a foldable display 10 according to some embodiments of this application. A display 102 includes a substrate 101, a display 102, a polarizer 103, and a protective layer 104 that are sequentially laminated from inside to outside. Two adjacent layers may be connected by using an adhesive. It may be understood that FIG. 4 only shows an example of some components included in the foldable display 10, and actual shapes, sizes, locations and constructions of these components are not limited by FIG. 4.

It should be noted that, in this application, the direction "outward" refers to a direction towards the outside of the foldable display terminal 100, and correspondingly, the direction "inward" refers to a direction towards the inside of the foldable display terminal 100.

Figure 5:
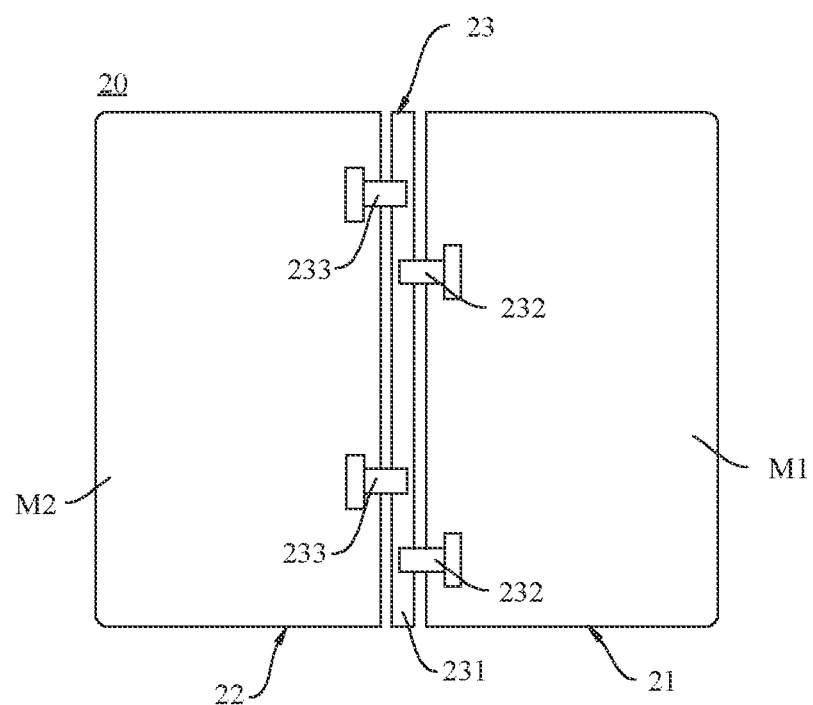
FIG. 5 is a front view of a support apparatus in the foldable display terminal shown in FIG. 1.

The support apparatus 20 is configured to support the foldable display 10 and allow the foldable display 10 to be folded between the unfolded state and the folded state. Referring to FIG. 5, FIG. 5 is a front view of a support apparatus 20 in the foldable display terminal 100 shown in FIG. 1. In this embodiment, the support apparatus 20 includes a first housing 21, a second housing 22, and a rotating mechanism 23. It may be understood that FIG. 5 only shows an example of some components included in the support apparatus 20, and actual shapes, sizes, locations and constructions of these components are not limited by FIG. 5.

The first housing 21 is configured to fix and support the first part 11 of the foldable display 10 in FIG. 1. Specifically, the first housing 21 has a lamination surface M1, and the first housing 21 is configured to fix and support the first part 11 of the foldable display 10 in FIG. 1 through the lamination surface M1.

The second housing 22 is configured to fix and support the second part 12 of the foldable display 10 in FIG. 1. Specifically, the second housing 22 has a lamination surface M2, and the second housing 22 is configured to fix and support the second part 12 of the foldable display 10 in FIG. 1 through the lamination surface M2.

A first accommodating cavity (not shown in the figure) is formed inside the first housing 21. A second accommodating cavity (not shown in the figure) is formed inside the second housing 22. The first accommodating cavity and the second accommodating cavity are configured to accommodate electronic components such as a main board, a battery, a camera module, a speaker, and a receiver of the electronic device.

Figure 6:
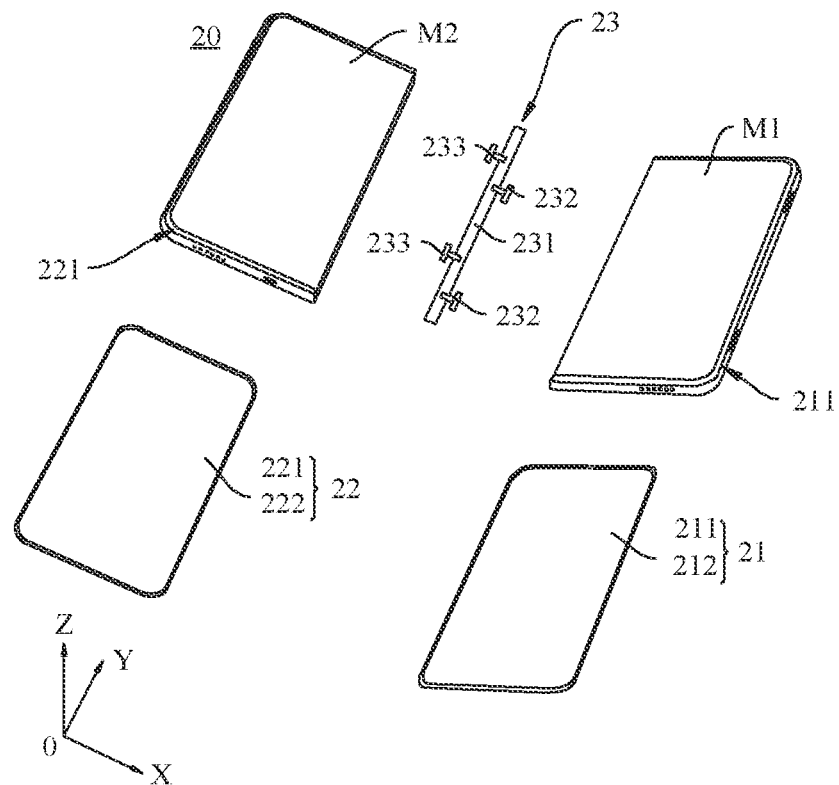
FIG. 6 is an exploded view of the support apparatus shown in FIG. 5.

In some embodiments, referring to FIG. 6, FIG. 6 is an exploded view of the support apparatus 20 shown in FIG. 5. The first housing 21 includes a first middle frame 211 and a first back cover 212. The lamination surface M1 is located on the first middle frame 211. The first back cover 212 is fixed to one side that is of the first middle frame 211 and that is away from the lamination surface M1. The first accommodating cavity is formed between the first middle frame 211 and the first back cover 212.

The second housing 22 includes a second middle frame 221 and a second back cover 222. The lamination surface M2 is located on the second middle frame 221. The second back cover 222 is fixed to one side that is of the second middle frame 221 and that is away from the lamination surface M2. The second accommodating cavity is formed between the second middle frame 221 and the second back cover 222.

The first middle frame 211 may be an integral structure, or may be formed by assembling a plurality of parts. Similarly, the second middle frame 221 may be an integral structure, or may be formed by assembling a plurality of parts.

The rotating mechanism 23 is connected between the first housing 21 and the second housing 22, and the first housing 21 and the second housing 22 are rotatably connected by using the rotating mechanism 23. In some embodiments, the rotating mechanism 23 is connected between the first middle frame 211 of the first housing 21 and the second middle frame 221 of the second housing 22. In other embodiments, the rotating mechanism 23 may be connected between the first back cover 212 of the first housing 21 and the second back cover 222 of the second housing 22.

Still referring to FIG. 5 and FIG. 6, the rotating mechanism 23 includes a base 231, a first oscillating arm 232, and a second oscillating arm 233. To facilitate the description of the following embodiments, an XYZ coordinate system is established for the rotating mechanism 23. Specifically, an axial direction of the rotating mechanism 23 is defined as a Y-axis direction, that is, an extending direction of a rotation axis of the first housing 21 is the Y-axis direction, a thickness direction of the rotating mechanism 23 is defined as a Z-axis direction; and a direction perpendicular to both the Y-axis direction and the Z-axis direction is defined as an X-axis direction. It may be understood that the coordinate system for the rotating mechanism 23 may be flexibly set based on actual needs. This is not specifically limited herein.

Referring to FIG. 5 and FIG. 6, the first housing 21 and the base 231 are rotatably connected and restrained by the first oscillating arm 232. The second housing 22 and the base 231 are connected and restrained by the second oscillating arm 233.

A quantity of the first oscillating arm 232 may be one, two, or more. FIG. 5 and FIG. 6 only show an example in which two first oscillating arms 232 are provided, which should not be construed as a special limitation to this application. The two first oscillating arms 232 are spaced along a length direction of a rotation axis of the foldable display 10. A quantity of the second oscillating arm 233 may be the same as that of the first oscillating arm 232. In this way, stress equilibrium between the first housing 21 and the second housing 22 may be guaranteed during rotation.

Figure 7:
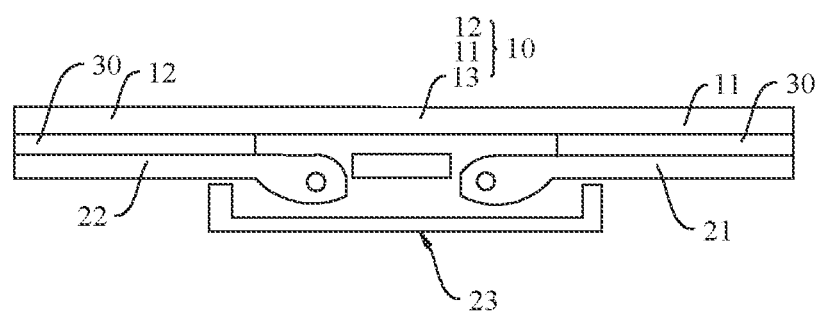
FIG. 7 is an assembly diagram of the support apparatus shown in FIG. 5 and the foldable display.
Figure 8:
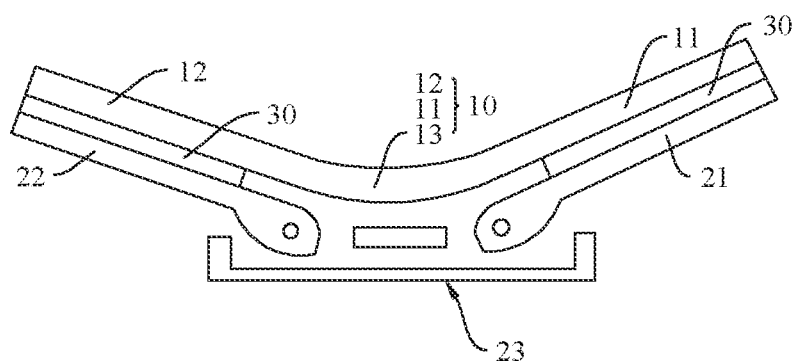
FIG. 8 is a schematic diagram showing a folding process of the foldable display terminal shown in FIG. 7.
Figure 9:
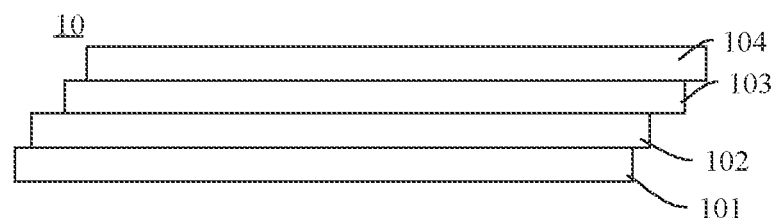
FIG. 9 is a schematic diagram showing relative displacement among layers of the foldable display during folding of the foldable display terminal shown in FIG. 7.
Figure 10:
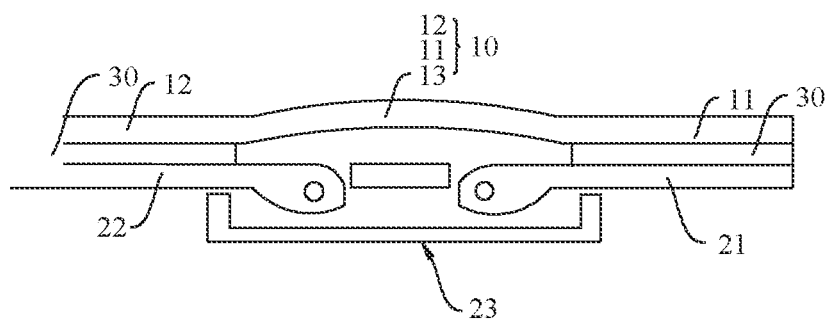
FIG. 10 is a schematic diagram showing an unfolded state of the foldable display terminal shown in FIG. 7 after repeated folding and unfolding.

Referring to FIG. 7, FIG. 7 is a schematic diagram of an assembly structure of a support apparatus 20 and a foldable display 10 in a foldable display terminal 100 according to some embodiments of this application. In this embodiment, the foldable display 10 is fixedly connected to the first housing 21 and the second housing 22. Specifically, the foldable display 10 is bonded to the first housing 21 and the second housing 22 by using an adhesive 30. When the foldable display terminal 100 is folded, referring to FIG. 8, FIG. 8 is a schematic diagram showing a folding process of the foldable display terminal 100 shown in FIG. 7, where the foldable display 10 is bent correspondingly. That is, during folding, the foldable display 10 rotates synchronously with the first housing 21 and the second housing 22, and a bendable part 13 of the foldable display 10 is stretched by a bending stress. Therefore, relative displacement among layers of the foldable display 10 may easily occur. Referring to FIG. 9, FIG. 9 is a schematic diagram showing relative displacement among layers of the foldable display 10 during folding of the foldable display terminal 100 shown in FIG. 7. In this way, after repeated folding and unfolding, referring to FIG. 10, FIG. 10 is a schematic diagram showing an unfolded state of the foldable display terminal 100 shown in FIG. 7 after repeated folding and unfolding. When the foldable display terminal 100 is in the unfolded state, the bendable part 13 of the foldable display 10 is prone to reverse arching or depression, resulting in poor display.

Figure 11A:
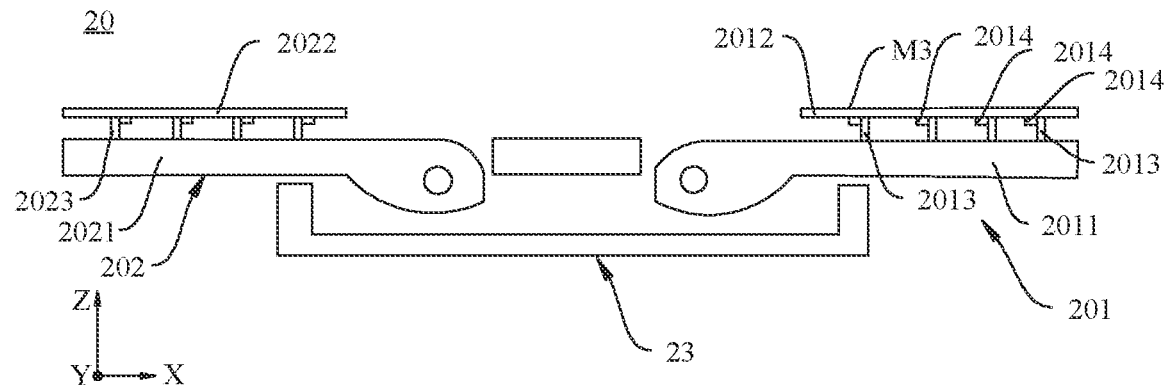
FIG. 11a is a schematic diagram of a structure of a support apparatus according to some other embodiments of this application.
Figure 11B:
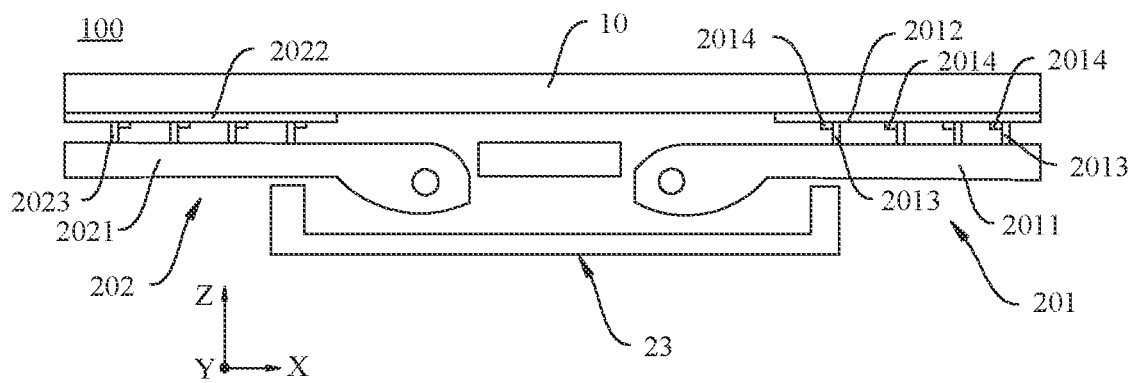
FIG. 11b is a schematic diagram of an assembly structure of the support apparatus shown in FIG. 11a and a foldable display.

To resolve the foregoing technical problem, referring to FIG. 11a and FIG. 11b, FIG. 11a is a schematic diagram of a structure of a support apparatus 20 according to some other embodiments of this application, and FIG. 11b is a schematic diagram of an assembly structure of the support apparatus 20 shown in FIG. 11a and a foldable display 10. The support apparatus 20 in this embodiment includes a rotating mechanism 23, a first support portion 201, and a second support portion 202. The first support portion 201 is configured to support the first part 11 of the foldable display 10, and the second support portion 202 is configured to support the second part 12 of the foldable display 10. The first support portion 201 and the second support portion 202 are respectively disposed on two sides of the rotating mechanism 23. Specifically, the first support portion 201 and the second support portion 202 are respectively disposed on the two sides of the rotating mechanism 23 along the X-axis direction, and the second support portion 202 and the first support portion 201 may be folded or unfolded opposite to each other.

Referring to FIG. 11a, the first support portion 201 includes a first support member 2011, a first elastic member 2013, and a first base plate 2012. The first base plate 2012 has a lamination surface M3, and the first base plate 2012 is configured to fix and support the first part 11 of the foldable display 10 in FIG. 1 through the lamination surface M3. In this embodiment, the first base plate 2012 is a structure independent of the structure of the foldable display 10. It may be understood that, in other embodiments, the first base plate 2012 may also be constructed from a rigid substrate in the foldable display 10.

The first base plate 2012 is formed into a rectangular plate-like structure, and a length direction of the first base plate 2012 is parallel to the Y-axis direction. Optionally, the first base plate 2012 is a plastic member. The first base plate 2012 and the foldable display 10 may be connected by using an adhesive, but not limited thereto.

The first support member 2011 may be formed into a rectangular plate-like structure. A length direction of the first support member 2011 is parallel to the Y-axis direction. The first support member 2011 is located on one side that is of the first base plate 2012 and that is away from the foldable display 10. The first support member 2011 is rotatably connected to the rotating mechanism 23. The structure of the first support member 2011 in this embodiment may be the same as the structure of the first housing 21 in the foldable display terminal 100 shown in FIG. 7, and a manner in which the first support member 2011 is connected to the rotating mechanism 23 may be the same as the manner in which the first housing 21 in the foldable display terminal 100 is connected to the rotating mechanism 23 shown in FIG. 7.

Figure 12:
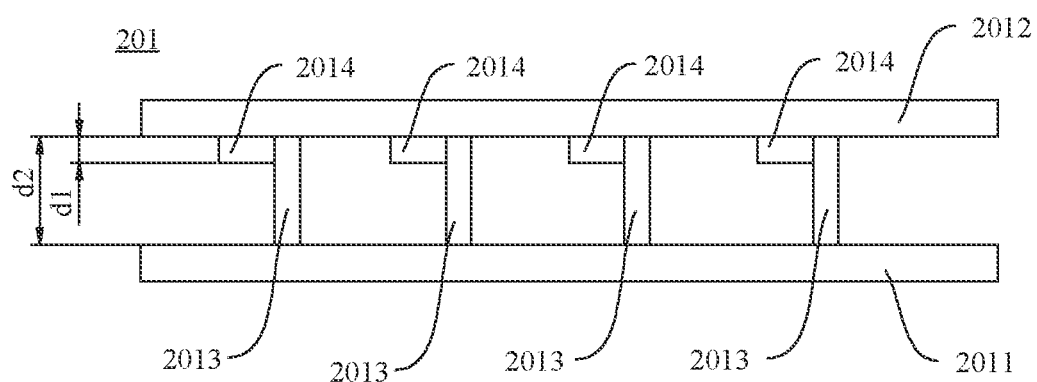

The first elastic member 2013 is connected between the first base plate 2012 and the first support member 2011. Specifically, referring to FIG. 12, FIG. 12 is a schematic diagram of a structure of a first support portion 201 in the support apparatus 20 shown in FIG. 11a. At this time, the foldable display terminal 100 is in an unfolded state. One end of the first elastic member 2013 is connected to the first support member 2011, and the other end of the first elastic member 2013 is connected to the first base plate 2012. It may be understood that the one end of the first elastic member 2013 may be directly connected to the first support member 2011, or may be indirectly connected to the first support member 2011 by using an intermediate medium. Similarly, the other end of the second elastic member 2023 may be directly connected to the first base plate 2012, or may be indirectly connected to the first base plate 2012 by using an intermediate medium. For example, the one end of the first elastic member 2013 may be connected to the first support member 2011 by using an adhesive, and the other end of the first elastic member 2013 may also be connected to the first base plate 2012 by using an adhesive.

Figure 13A:
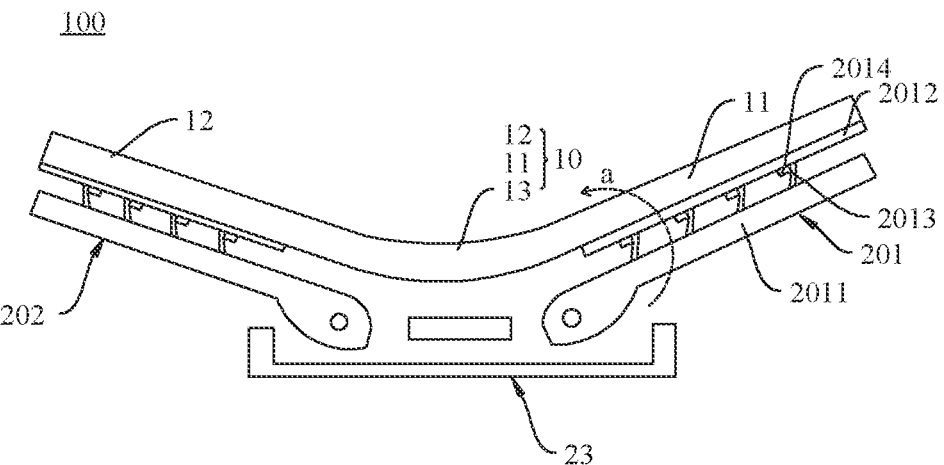
FIG. 13a is a schematic diagram of a structure during folding of the foldable display terminal shown in FIG. 11b.
Figure 13B:
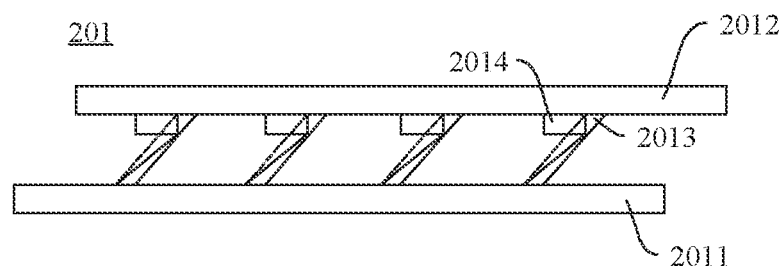

The first elastic member 2013 is elastically deformable to enable the first base plate 2012 to move in a direction close to or away from the rotating mechanism 23 with respect to the first support member 2011. Referring to FIG. 13a to FIG. 13b, FIG. 13a is a schematic diagram showing a folding process of the foldable display terminal 100 shown in FIG. 11 b, and FIG. 13b is a schematic diagram of a structure of a first support portion 201 in the foldable display terminal 100 shown in FIG. 13a.

During folding of the foldable display terminal 100, the first support member 2011 rotates along direction a with respect to the rotating mechanism 23, the bendable part 13 of the foldable display 10 is bent, and the first part 11 of the foldable display 10 tends to move in a direction away from the rotating mechanism 23 with respect to the first support portion 201. Because the first elastic member 2013 is elastically deformable to enable the first base plate 2012 to move in the direction close to or away from the rotating mechanism 23 with respect to the first support member 2011, the first part 11 of the foldable display 10 may move with the first base plate 2012 in the direction away from the rotating mechanism 23 with respect to the first support member 2011 during folding. At this time, in a direction from the first support member 2011 to the first base plate 2012, the first elastic member 2013 is inclined in the direction away from the rotating mechanism 23, resulting in elastic deformation.

When the foldable display terminal 100 is unfolded, the first support member 2011 rotates with respect to the rotating mechanism 23, the bendable part 13 of the foldable display 10 is unfolded, and the first part 11 of the foldable display 10 tends to move in a direction close to the rotating mechanism 23 with respect to the first support portion 201. Because the first elastic member 2013 is elastically deformable to enable the first base plate 2012 to move in the direction close to or away from the rotating mechanism 23 with respect to the first support member 2011, the first part 11 of the foldable display 10 may move with the first base plate 2012 in the direction close to the rotating mechanism 23 with respect to the first support member 2011 during unfolding, and meanwhile, the first elastic member 2013 recovers from the deformation. In this way, during folding or unfolding of the foldable display terminal 100, relative movement between the first base plate 2012 and the first support member 2011 is implemented by using the first elastic member 2013, so as to provide a sliding space to the foldable display 10, thereby reducing a stress on the foldable display 10 during folding, and reducing relative displacement among layers of the foldable display 10, so that deformation of the bendable part 13 of the foldable display 10 due to repeated folding or unfolding may be avoided, thereby prolonging the service life of the foldable display 10.

According to the support apparatus 20 provided in this embodiment of this application, the elastically deformable first elastic member 2013 is disposed between the first base plate 2012 and the first support member 2011, so that relative movement between the first base plate 2012 and the first support member 2011 in a direction close to or away from the rotating mechanism 23 can be implemented when the foldable display terminal 100 is folded or unfolded, so as to provide a sliding space to the foldable display 10 when the foldable display terminal 100 is folded or unfolded, thereby reducing a stress on the foldable display 10 during folding, and reducing relative displacement among layers of the foldable display 10, so that deformation of a bendable part 13 of the foldable display 10 due to repeated folding or unfolding may be avoided, thereby prolonging the service life of the foldable display 10.

Figure 14:
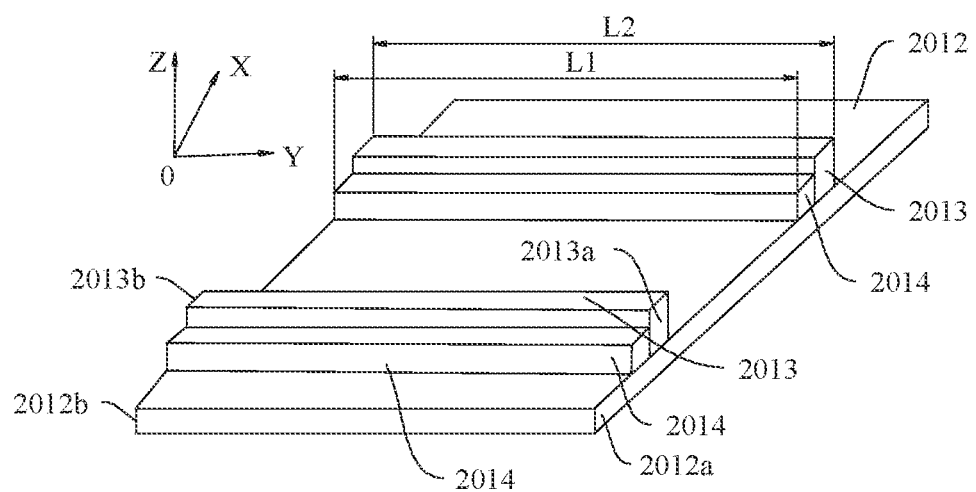
FIG. 14 is a schematic diagram of an assembly structure of a first base plate and a first elastic member of the first support portion shown in FIG. 12.

In some embodiments, referring to FIG. 14, FIG. 14 is a schematic diagram of an assembly structure of a first base plate 2012 and a first elastic member 2013 of the first support portion 201 shown in FIG. 12. The first elastic member 2013 is formed into a strip, and a length direction of the first elastic member 2013 is parallel to a rotation axis of the first support member 2011. That is, the length direction of the first elastic member 2013 is parallel to the Y-axis direction. In this way, during folding of the foldable display terminal 100, the first elastic member 2013 is prone to elastic deformation, and stress uniformity that is of the first base plate 2012 and that is in the Y-axis direction may be guaranteed. In addition, a quantity of the first elastic member 2013 may be small to reduce installation complexity.

On the basis of the foregoing embodiments, two ends, in the length direction, of the first elastic member 2013 extend respectively to be flush with two ends of the first base plate 2012. For example, referring to FIG. 14, the two ends, in the length direction, of the first elastic member 2013 are a first end 2013a and a second end 2013b, and the two ends, in the Y-axis direction, of the first base plate 2012 are a third end 2012a and a fourth end 2012b. The first end 2013a of the first elastic member 2013 may extend to be flush with an end face of the third end 2012a of the first base plate 2012, and the second end 2013b of the first elastic member 2013 may extend to be flush with an end face of the fourth end 2012b of the first base plate 2012. In this way, the stress uniformity that is of the first base plate 2012 and that is in the Y-axis direction may be further improved.

In this embodiment, a quantity of the first elastic member 2013 is more than one, and each first elastic member 2013 is connected between the first base plate 2012 and the first support member 2011. The plurality of first elastic members 2013 are spaced along a first direction, where the first direction is perpendicular to the rotation axis of the first support member 2011. Specifically, referring to FIG. 14, the first direction is a width direction of the first base plate 2012, that is, the X-axis direction in FIG. 14. The plurality of first elastic members 2013 are spaced in the width direction of the first base plate 2012. In this way, stress uniformity that is of the first base plate 2012 and that is in the first direction may be guaranteed.

On the basis of the foregoing embodiments, referring to FIG. 12, the support apparatus 20 further includes a first stop portion 2014, the first stop portion 2014 is disposed on a surface that is of the first base plate 2012 and that faces the first support member 2011, the first elastic member 2013 is connected to the first stop portion 2014, and at least a part of the first stop portion 2014 is located on one side that is of the first elastic member 2013 and that is close to the rotating mechanism 23. In the embodiments shown in FIG. 12, the first stop portion 2014 is wholly located on the side that is of the first elastic member 2013 and that is close to the rotating mechanism 23. It may be understood that, in other embodiments, a part of the first stop portion 2014 may be located on the side that is of the first elastic member 2013 and that is close to the rotating mechanism 23, and another part of the first stop portion 2014 may be located on the side that is of the first elastic member 2013 and that is away from the rotating mechanism 23, provided that at least a part of the first stop portion 2014 is located on the side that is of the first elastic member 2013 and that is close to the rotating mechanism 23.

In this way, during folding of the foldable display terminal 100, referring to FIG. 13b, one end that is of the first stop portion 2014 and that is close to the first elastic member 2013 is abutted against and cooperates with a side wall that is of the first elastic member 2013 and that is close to the rotating mechanism 23 to limit an inclination angle and a deformation amount of the first elastic member 2013, so that the deformation amount of the first elastic member 2013 may be adjusted by the first stop portion 2014 to avoid excessive deformation of the first elastic member 2013, and improve reliability of the support apparatus 20.

Dashed lines in FIG. 13b show a schematic diagram of a state in which the side wall that is of the first elastic member 2013 and that is close to the rotating mechanism 23 is not stopped by the first stop portion 2014.

In some embodiments, referring to FIG. 12, the first elastic member 2013 is connected to one end that is of the first stop portion 2014 and that is away from the rotating mechanism 23. When the foldable display terminal 100 is in an unfolded state, the first stop portion 2014 and the first elastic member 2013 generally form a "7" shape. The structure is simple, and processing is easy. In addition, during folding of the foldable display terminal 100, a stop effect of the first stop portion 2014 on the first elastic member 2013 can be easily achieved.

Referring to FIG. 14, the first stop portion 2014 is formed into a strip, the length direction of the first stop portion 2014 is consistent with the length direction of the first elastic member 2013, and a length L1 of the first stop portion 2014 is equal to a length L2 of the first elastic member 2013. In this way, the stop effect of the first stop portion 2014 may be improved, and a quantity of the first stop portion 2014 may be small during assembly to reduce installation complexity.

A thickness d1 of the first stop portion 2014 is less than a spacing d2 between the first base plate 2012 and the first support member 2011. In this way, referring to FIG. 12 and FIG. 13a, a side surface that is of the first stop portion 2014 and that faces the first support member 2011 is spaced apart from the first support member 2011. In this way, the deformation amount of the first elastic member 2013 may be guaranteed while the stop effect of the first stop portion 2014 is guaranteed.

To improve the stop effect of the first stop portion 2014, an elastic modulus of the first stop portion 2014 may be higher than that of the first elastic member 2013. A greater elastic modulus indicates higher stiffness of a material, that is, less elastic deformation of the material under a stress. For example, the first stop portion 2014 may be a plastic member, and the first elastic member 2013 may be a rubber member or a silicone member.

In some embodiments, the first elastic member 2013 and the first stop portion 2014 are in an integrated structure. That is, the first elastic member 2013 and the first stop portion 2014 are integrally formed. Optionally, the first elastic member 2013 and the first stop portion 2014 may be integrally injection-molded. When the first elastic member 2013 and the first stop portion 2014 are made of different materials, the first elastic member 2013 and the first stop portion 2014 may be integrally formed by using a double-shot molding process. Therefore, the processing technology for the first support portion 201 may be simplified to improve the processing efficiency.

In some embodiments, the first stop portion 2014 and the first base plate 2012 are in an integrated structure. That is, the first stop portion 2014 and the first base plate 2012 are integrally formed. For example, the first elastic member 2013 and the first stop portion 2014 may be integrally injection-molded. Therefore, the processing technology for the first support portion 201 may be further simplified to improve the processing efficiency.

In other embodiments, when the first stop portion 2014 and the first base plate 2012 have a split structure, the first stop portion 2014 and the first base plate 2012 may be connected by using an adhesive, but not limited thereto.

Figure 15A:
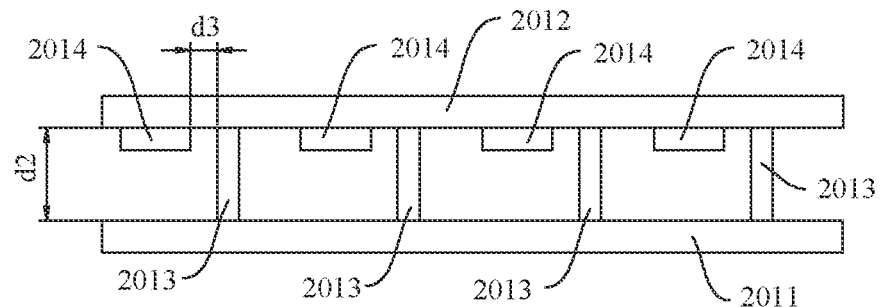
FIG. 15a is a schematic diagram of a structure of a first support portion according to some other embodiments of this application.
Figure 15B:
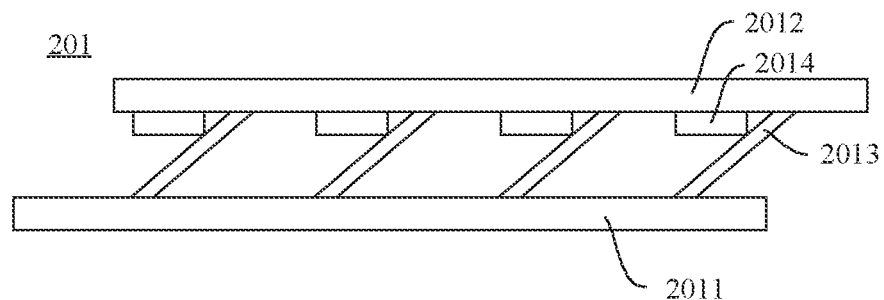
FIG. 15b is a schematic diagram of a structure of the first support portion shown in FIG. 15a when the foldable display terminal is being folding or in a folded state.

In some embodiments, referring to FIG. 15a, FIG. 15a is a schematic diagram of a structure of a first support portion 201 according to some other embodiments of this application. The first support portion 201 in this embodiment differs from the first support portion 201 shown in FIG. 12 in that the first stop portion 2014 in this embodiment is spaced apart from the first 25 elastic member 2013. A spacing d3 between the first stop portion 2014 and the first elastic member 2013 is less than a spacing d2 between the first base plate 2012 and the first support member 2011. That is, the spacing d3 between the first stop portion 2014 and the first elastic member 2013 is less than a thickness of the first elastic member 2013. Referring to FIG. 15b, FIG. 15b is a schematic diagram of a structure of the first support portion 201 shown in FIG. 15a when the foldable display terminal 100 is being folded or in a folded state. In this embodiment, during folding of the foldable display terminal 100, the first stop portion 2014 may also be abutted against the side wall that is of the first elastic member 2013 and that is close to the rotating mechanism 23 to limit an inclination angle and a deformation amount of the first elastic member 2013, so that the deformation amount of the first elastic member 2013 may be adjusted by the first stop portion 2014 to avoid excessive deformation of the first elastic member 2013, thereby improving the reliability of the support apparatus 20.

Figure 16A:
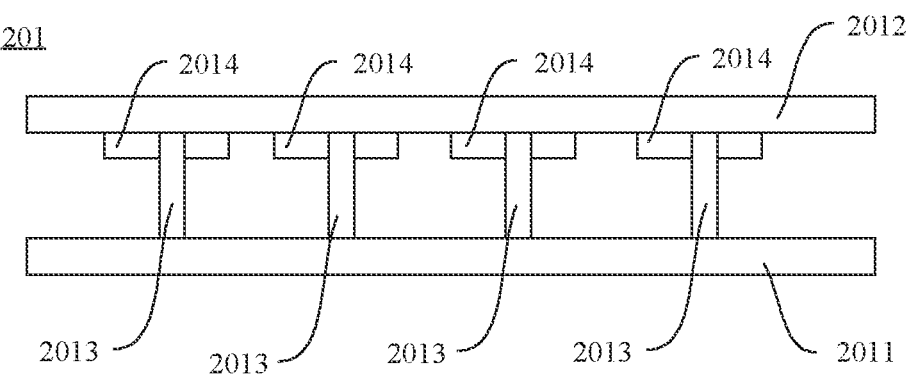
FIG. 16a is a schematic diagram of a structure of a first support portion according to some other embodiments of this application.

In some embodiments, referring to FIG. 16a, FIG. 16a is a schematic diagram of a structure of a first support portion 201 according to some other embodiments of this application. The first support portion 201 in this embodiment differs from the first support portion 201 shown in FIG. 12 in that a part of the first stop portion 2014 in this embodiment is located on the side that is of the first elastic member 2013 and that is close to the rotating mechanism 23, and another part of the first stop portion 2014 is located on the side that is of the first elastic member 2013 and that is away from the rotating mechanism 23. Referring to FIG. 16a, when the foldable display terminal 100 is in an unfolded state, the first elastic member 2013 and the first stop portion 2014 generally form a "T" shape.

Figure 16B:
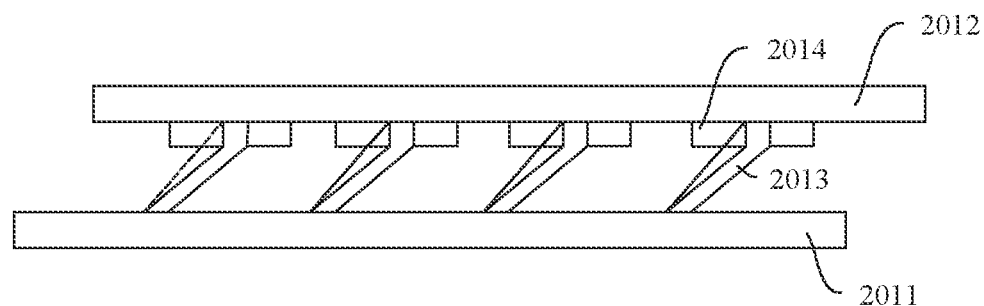
FIG. 16b is a schematic diagram of a structure of the first support portion shown in FIG. 16a when the foldable display terminal is being folding or in a folded state.

Referring to FIG. 16b, FIG. 16b is a schematic diagram of a structure of the first support portion 201 shown in FIG. 16a when the foldable display terminal 100 is being folded or in a folded state. During folding of the foldable display terminal 100, the first stop portion 2014 may also be abutted against the side wall that is of the first elastic member 2013 and that is close to the rotating mechanism 23 to limit an inclination angle and a deformation amount of the first elastic member 2013, so that the deformation amount of the first elastic member 2013 may be adjusted by the first stop portion 2014 to avoid excessive deformation of the first elastic member 2013, thereby improving the reliability of the support apparatus 20.

Figure 17A:
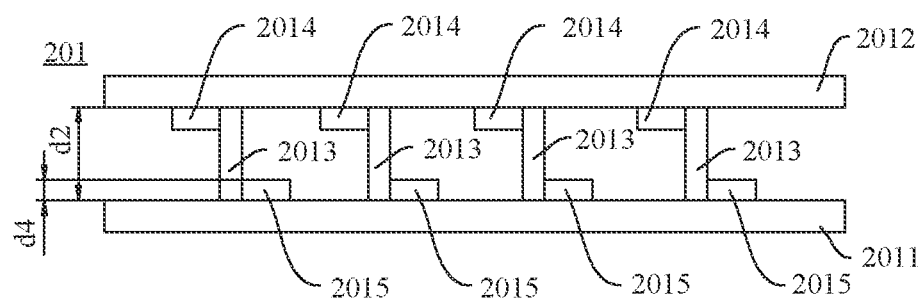
FIG. 17a is a schematic diagram of a structure of a first support portion according to some other embodiments of this application.

In some embodiments, referring to FIG. 17a, FIG. 17a is a schematic diagram of a structure of a first support portion 201 according to some other embodiments of this application. The first support portion 201 in this embodiment differs from the first support portion 201 shown in FIG. 12 in that the first support portion 201 in this embodiment further includes a second stop portion 2015 in addition to the first base plate 2012, the first elastic member 2013, the first support member 2011, and the first stop portion 2014 of the first support portion 201 shown in FIG. 12.

Specifically, the second stop portion 2015 is disposed on a side surface that is of the first support member 2011 and that faces the first base plate 2012, and at least a part of the second stop portion 2015 is located on one side that is of the first elastic member 2013 and that is away from the rotating mechanism 23. For example, in the embodiments shown in FIG. 17a, the second stop portion 2015 is wholly located on the side that is of the first elastic member 2013 and that is away from the rotating mechanism 23. It may be understood that, in other embodiments, a part of the second stop portion 2015 may be located on the side that is of the first elastic member 2013 and that is away from the rotating mechanism 23, and another part of the second stop portion 2015 may be located on the side that is of the first elastic member 2013 and that is close to the rotating mechanism 23.

Figure 17B:
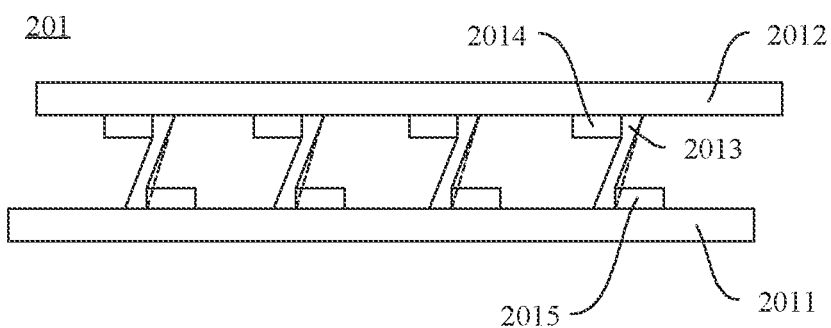
FIG. 17b is a schematic diagram of a structure of the first support portion shown in FIG. 17a when the foldable display terminal is being folding or in a folded state.

Referring to FIG. 17b, FIG. 17b is a schematic diagram of a structure of the first support portion 201 shown in FIG. 17a when the foldable display terminal 100 is being folded or in a folded state. During folding of the foldable display terminal 100, one end that is of the first stop portion 2014 and that is close to the first elastic member 2013 is abutted against a side wall that is of the first elastic member 2013 and that is close to the rotating mechanism 23, and one end that is of the second stop portion 2015 and that is close to the first elastic member 2013 is abutted against a side wall that is of the first elastic member 2013 and that is away from the rotating mechanism 23. Therefore, an inclination angle and a deformation amount of the first elastic member 2013 may be limited by the first stop portion 2014 and the second stop portion 2015, so that the deformation amount of the first elastic member 2013 may be adjusted to avoid excessive deformation of the first elastic member 2013, thereby improving the reliability of the support apparatus 20. Dashed lines in FIG. 17b show a schematic diagram of a state in which the side wall that is of the first elastic member 2013 and that is away from the rotating mechanism 23 is not stopped by the second stop portion 2015.

In this embodiment, referring to FIG. 17a, the first elastic member 2013 may be connected to one end that is of the second stop portion 2015 and that is close to the rotating mechanism 23. When the foldable display terminal 100 is in an unfolded state, the first stop portion 2014, the second stop portion 2015, and the first elastic member 2013 generally form a "Z" shape. The structure is simple, and processing is easy. In addition, a stop effect of the first stop portion 2014 and the second stop portion 2015 on the first elastic member 2013 can be easily achieved.

Figure 18:
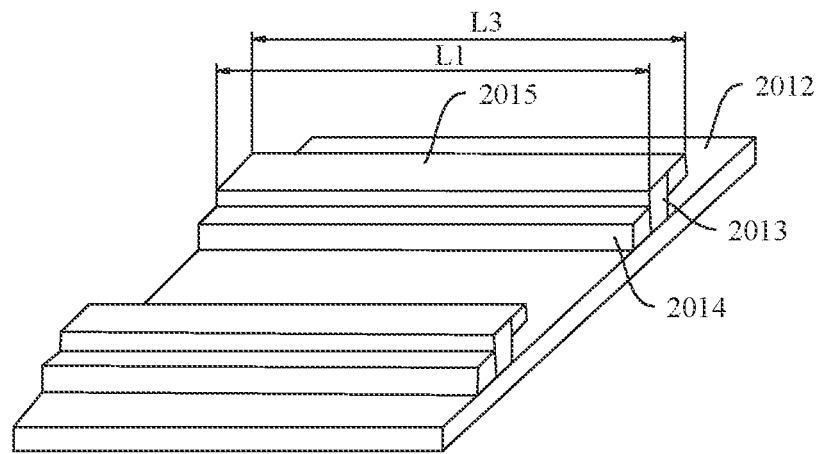

Referring to FIG. 18, FIG. 18 is a schematic diagram of an assembly structure of the first base plate 2012, the first elastic member 2013, the first stop portion 2014, and the second stop portion 2015 shown in FIG. 17a. The second stop portion 2015 is formed into a strip, the length direction of the second stop portion 2015 is consistent with the length direction of the first elastic member 2013, and a length L3 of the second stop portion 2015 is equal to the length L1 of the first elastic member 2013. In this way, the stop effect of the second stop portion 2015 may be improved, and a quantity of the second stop portion 2015 may be small during assembly to reduce installation complexity.

Referring to FIG. 17a, a thickness d4 of the second stop portion 2015 is less than the spacing d2 between the first base plate 2012 and the first support member 2011. Specifically, a side surface that is of the second stop portion 2015 and that faces the first base plate 2012 is spaced apart from the first base plate 2012. In this way, the deformation amount of the first elastic member 2013 may be guaranteed while the stop effect of the second stop portion 2015 is guaranteed.

Figure 19A:
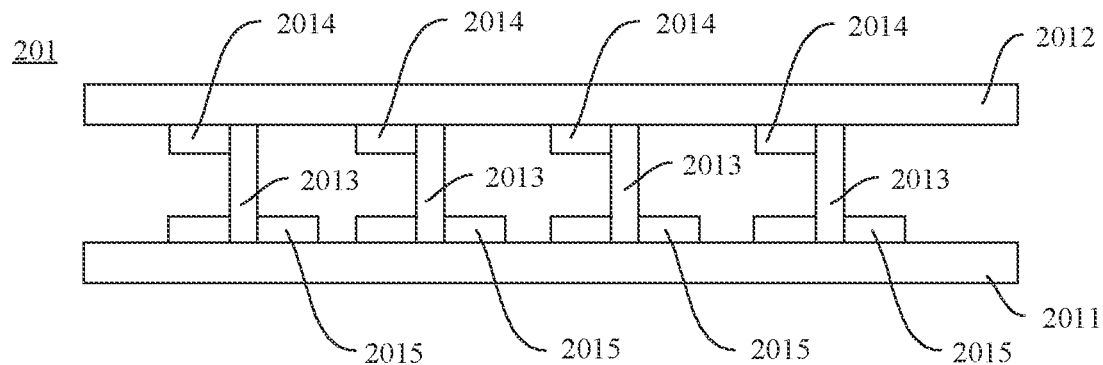
FIG. 19a is a schematic diagram of a structure of a first support portion according to some other embodiments of this application.

In some other embodiments, referring to FIG. 19a, FIG. 19a is a schematic diagram of a structure of a first support portion 201 according to some other embodiments of this application. The first support portion 201 in this embodiment differs from the first support portion 201 shown in FIG. 17a in that a part of the second stop portion 2015 in this embodiment is located on the side that is of the first elastic member 2013 and that is close to the rotating mechanism 23, and another part of the second stop portion 2015 is located on the side that is of the first elastic member 2013 and that is away from the rotating mechanism 23. When the foldable display terminal 100 is in an unfolded state, the first elastic member 2013 and the second stop portion 2015 generally form a "T" shape.

Figure 19B:
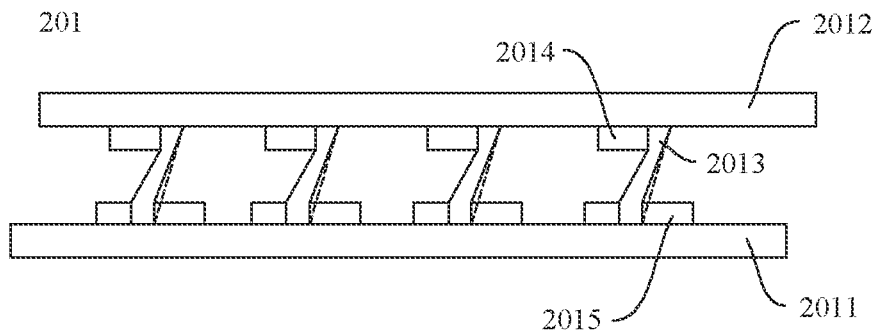
FIG. 19b is a schematic diagram of a structure of the first support portion shown in FIG. 19a when the foldable display terminal is being folding or in a folded state.

Referring to FIG. 19b, FIG. 19b is a schematic diagram of a structure of the first support portion 201 shown in FIG. 19a when the foldable display terminal 100 is being folded or in a folded state. During folding of the foldable display terminal 100, one end that is of the first stop portion 2014 and that is close to the first elastic member 2013 is abutted against a side wall that is of the first elastic member 2013 and that is close to the rotating mechanism 23, and one end that is of the second stop portion 2015 and that is close to the first elastic member 2013 is abutted against a side wall that is of the first elastic member 2013 and that is away from the rotating mechanism 23. Therefore, an inclination angle and a deformation amount of the first elastic member 2013 may also be limited by the first stop portion 2014 and the second stop portion 2015, so that the deformation amount of the first elastic member 2013 may be adjusted to avoid excessive deformation of the first elastic member 2013, thereby improving the reliability of the support apparatus 20. Dashed lines in FIG. 19b show a schematic diagram of a state in which the side wall that is of the first elastic member 2013 and that is away from the rotating mechanism 23 is not stopped by the second stop portion 2015.

Figure 20A:
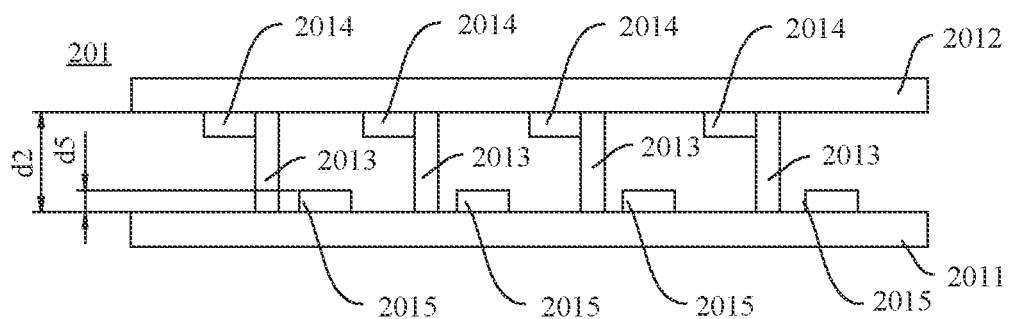
FIG. 20a is a schematic diagram of a structure of a first support portion according to some other embodiments of this application.

In some other embodiments, referring to FIG. 20a, FIG. 20a is a schematic diagram of a structure of a first support portion 201 according to some other embodiments of this application. The first support portion 201 in this embodiment differs from the first support portion 201 shown in FIG. 17a in that the second stop portion 2015 in the first support portion 201 in this embodiment is spaced apart from the first elastic member 2013. A spacing d5 between the second stop portion 2015 and the first elastic member 2013 is less than the spacing d2 between the first base plate 2012 and the first support member 2011. That is, the spacing d5 between the second stop portion 2015 and the first elastic member 2013 is less than the thickness of the first elastic member 2013.

Figure 20B:
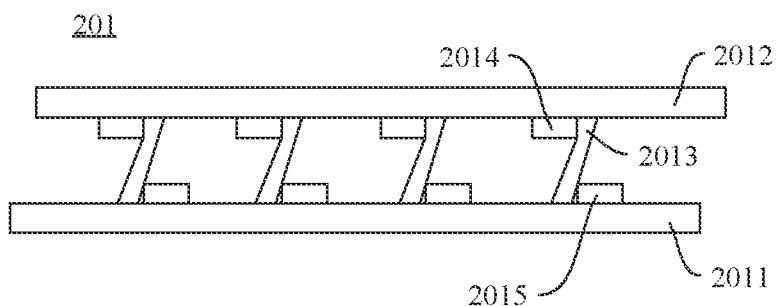
FIG. 20b is a schematic diagram of a structure of the first support portion shown in FIG. 20a when the foldable display terminal is being folding or in a folded state.

Referring to FIG. 20b, FIG. 20b is a schematic diagram of a structure of the first support portion 201 shown in FIG. 20a when the foldable display terminal 100 is being folded or in a folded state. During folding of the foldable display terminal 100, one end that is of the first stop portion 2014 and that is close to the first elastic member 2013 is abutted against a side wall that is of the first elastic member 2013 and that is close to the rotating mechanism 23, and one end that is of the second stop portion 2015 and that is close to the first elastic member 2013 is abutted against a side wall that is of the first elastic member 2013 and that is away from the rotating mechanism 23. Therefore, an inclination angle and a deformation amount of the first elastic member 2013 may also be limited by the first stop portion 2014 and the second stop portion 2015, so that the deformation amount of the first elastic member 2013 may be adjusted to avoid excessive deformation of the first elastic member 2013, thereby improving the reliability of the support apparatus 20. Dashed lines in FIG. 20b show a schematic diagram of a state in which the side wall that is of the first elastic member 2013 and that is away from the rotating mechanism 23 is not stopped by the second stop portion 2015.

Figure 21A:
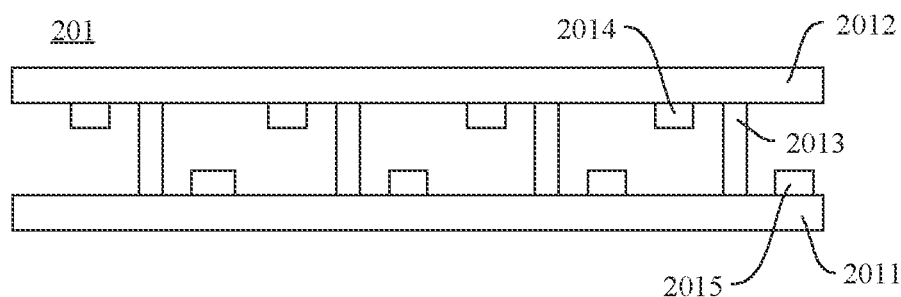
FIG. 21a is a schematic diagram of a structure of a first support portion according to some other embodiments of this application.
Figure 21B:
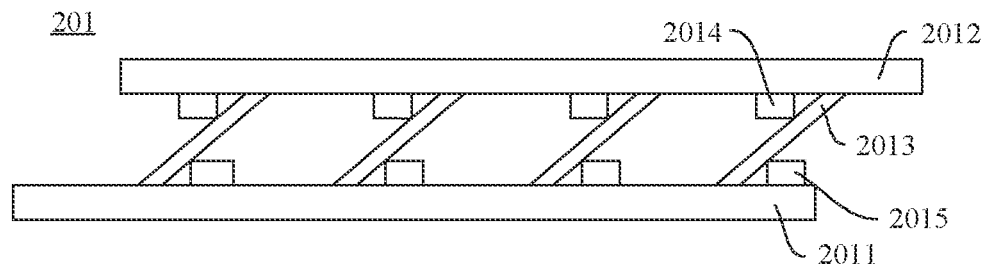
FIG. 21b is a schematic diagram of a structure of the first support portion shown in FIG. 21a when the foldable display terminal is being folding or in a folded state.

In some other embodiments, referring to FIG. 21a to FIG. 21b, FIG. 21a is a schematic diagram of a structure of a first support portion 201 according to some other embodiments of this application, and FIG. 21b is a schematic diagram of a structure of the first support portion 201 shown in FIG. 21a when the foldable display terminal 100 is being folded or in a folded state. The first support portion 201 in this embodiment differs from the first support portion 201 shown in FIG. 20a in that the first stop portion 2014 in the first support portion 201 in this embodiment is spaced apart from the first elastic member 2013. In this way, during folding of the foldable display terminal 100, one end that is of the first stop portion 2014 and that is close to the first elastic member 2013 is abutted against a side wall that is of the first elastic member 2013 and that is close to the rotating mechanism 23, and one end that is of the second stop portion 2015 and that is close to the first elastic member 2013 is abutted against a side wall that is of the first elastic member 2013 and that is away from the rotating mechanism 23. Therefore, an inclination angle and a deformation amount of the first elastic member 2013 may be limited by the first stop portion 2014 and the second stop portion 2015, so that the deformation amount of the first elastic member 2013 may be adjusted to avoid excessive deformation of the first elastic member 2013, thereby improving the reliability of the support apparatus 20.

Figure 22:
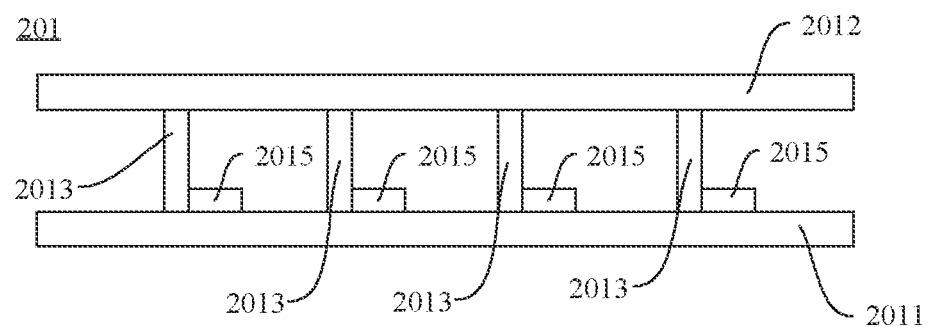
FIG. 22 is a schematic diagram of a structure of a first support portion according to some other embodiments of this application.

It may be understood that, in some other embodiments, referring to FIG. 22, FIG. 22 is a schematic diagram of a structure of a first support portion 201 according to some other embodiments of this application. The first support portion 201 in this embodiment differs from the first support portion 201 shown in FIG. 17a in that the first support portion 201 in this embodiment includes only the first base plate 2012, the first elastic member 2013, the first support member 2011, and the second stop portion 2015 of the first support portion 201 shown in FIG. 17a, but does not include the first stop portion 2014. In this way, during folding of the foldable display terminal 100, the second stop portion 2015 may be abutted against the side wall that is of the first elastic member 2013 and that is away from the rotating mechanism 23, so that the deformation amount of the first elastic member 2013 may be adjusted by the second stop portion 2015 to avoid excessive deformation of the first elastic member 2013, thereby improving the reliability of the support apparatus 20.

In this embodiment, the second stop portion 2015 is connected to one end that is of the first elastic member 2013 and that is away from the rotating mechanism 23. It may be understood that, in other embodiments, the second stop portion 2015 may also be spaced apart from the first elastic member 2013.

Figure 23:
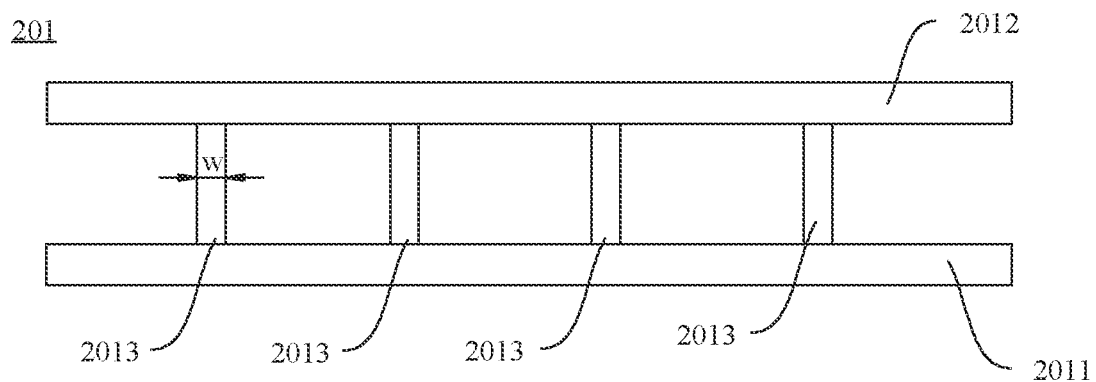
FIG. 23 is a schematic diagram of a structure of a first support portion according to some other embodiments of this application.

In some other embodiments, referring to FIG. 23, FIG. 23 is a schematic diagram of a structure of a first support portion 201 according to some other embodiments of this application. The first support portion 201 in this embodiment differs from the first support portion 201 shown in FIG. 12 in that the first support portion 201 in this embodiment includes only the first base plate 2012, the first elastic member 2013, and the first support member 2011 of the first support portion 201 shown in FIG. 12, but does not include the first stop portion 2014.

Figure 24:
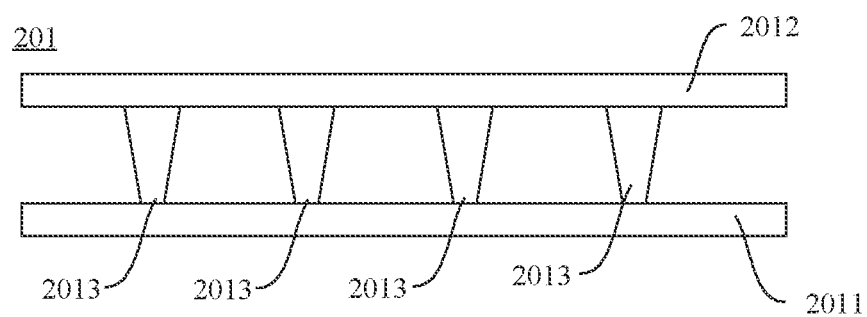
FIG. 24 is a schematic diagram of a structure of a first support portion according to some other embodiments of this application.

A width w of the first elastic member 2013 remains unchanged in a direction from the first base plate 2012 to the first support member 2011. The structure is simple, and processing is easy. Certainly, this application is not limited thereto. In other embodiments, referring to FIG. 24, FIG. 24 is a schematic diagram of a structure of a first support portion 201 according to some other embodiments of this application. In this embodiment, the width w of the first elastic member 2013 gradually increases in a direction from the first base plate 2012 to the first support member 2011.

In some embodiments, referring back to FIG. 11a, the structure of the second support portion 202 is the same as that of the first support portion 201, and the second support portion 202 and the first support portion 201 are symmetrically disposed on two sides of the rotating mechanism 23. For example, the second support portion 202 includes a second support member 2021, a second elastic member 2023, and a second base plate 2022. The second support member 2021 is laminated with the second base plate 2022. The second elastic member 2023 is connected between the second support member 2021 and the second base plate 2022, and the second elastic member 2023 is elastically deformable to enable the second base plate 2022 and the second support member 2021 to move relative to each other.

Figure 25:
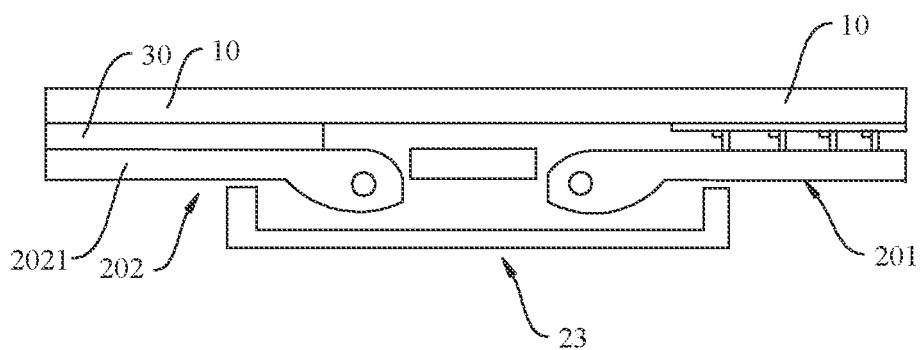
FIG. 25 is a schematic diagram of a structure of a support apparatus according to some other embodiments of this application.

In other embodiments, the structure of the second support portion 202 may also be different from that of the first support portion 201. Referring to FIG. 25, FIG. 25 is a schematic diagram of a structure of a support apparatus 20 according to some other embodiments of this application. In this embodiment, the second support portion 202 includes only the second support member 2021, but does not include the second elastic member 2023 and the second base plate 2022 in the foregoing embodiments. In this embodiment, the second part 12 of the foldable display 10 is directly bonded to the second support member 2021 by using an adhesive 30.

In the description of the specification, specific features, structures, materials or characteristics may be combined in any suitable manner in one or more embodiments or examples.

Finally, it should be noted that the foregoing embodiments are only used to illustrate the technical solutions of this application, but are not used to limit this application. Although this application has been described in detail with reference to the foregoing embodiments, it should be understood by a person of ordinary skill in the art that the technical solutions described in the foregoing embodiments may still be modified, or some technical features thereof are equivalently replaced. These modifications or replacements do not make the essence of the corresponding technical solutions depart from the spirit and scope of the technical solutions of the embodiments of this application.

What is claimed is:

1. A terminal, comprising:
    a foldable display, comprising:
        a first part;
        a second part; and
        a bendable part between the first part and the second part; and
    a support apparatus, comprising:
        a rotating mechanism;
        a first support portion configured to support the first part, the first support portion comprising:
            a first support member rotatably connected to the rotating mechanism;
            a first base plate; and
            a first elastic member connected between the first base plate and the first support member, wherein the first elastic member is elastically deformable to enable the first base plate to move in a direction toward or away from the rotating mechanism with respect to the first support member; and
        a second support portion, wherein the second support portion and the first support portion are respectively disposed on two sides of the rotating mechanism, and the second support portion and the first support portion may be folded or unfolded opposite to each other.

2. The terminal of claim 1, wherein the first elastic member is formed into a strip, and a length direction of the first elastic member is parallel to a rotation axis of the first support member.

3. The terminal of claim 2, wherein two ends, in the length direction, of the first elastic member extend respectively to be flush with two ends of the first base plate.

4. The terminal of claim 3, wherein the first elastic member comprises a plurality of first elastic members that are spaced along a first direction, and the first direction is perpendicular to the rotation axis of the first support member.

5. The terminal of claim 3, wherein the first support portion further comprises a first stop portion disposed on a side surface of the first base plate that faces the first support member, wherein at least a part of the first stop portion is located on one side of the first elastic member that is close to the rotating mechanism.

6. The terminal of claim 2, wherein the first elastic member comprises a plurality of first elastic members that are spaced along a first direction, and the first direction is perpendicular to the rotation axis of the first support member.

7. The terminal of claim 6, wherein the first support portion further comprises a first stop portion disposed on a side surface of the first base plate that faces the first support member, wherein at least a part of the first stop portion is located on one side of the first elastic member that is close to the rotating mechanism.

8. The terminal of claim 2, wherein the first support portion further comprises a first stop portion disposed on a side surface of the first base plate that faces the first support member, wherein at least a part of the first stop portion is located on one side of the first elastic member that is close to the rotating mechanism.

9. The terminal of claim 1, wherein the first support portion further comprises a first stop portion disposed on a side surface of the first base plate that faces the first support member, wherein at least a part of the first stop portion is located on one side of the first elastic member that is close to the rotating mechanism.

10. The terminal of claim 9, wherein the first elastic member is connected to one end of the first stop portion that is away from the rotating mechanism.

11. The terminal of claim 10, wherein the first elastic member and the first stop portion are in an integrated structure.

12. The terminal of claim 11, wherein the first stop portion and the first base plate are in an integrated structure.

13. The terminal of claim 10, wherein the first stop portion and the first base plate are in an integrated structure.

14. The terminal of claim 13, wherein an elastic modulus of the first stop portion is greater than an elastic modulus of the first elastic member.

15. The terminal of claim 9, wherein an elastic modulus of the first stop portion is greater than an elastic modulus of the first elastic member.

16. The terminal of claim 1, wherein the first support portion further comprises a second stop portion disposed on a side surface of the first support member that faces the first base plate, wherein at least a part of the second stop portion is located on one side of the first elastic member that is away from the rotating mechanism.

17. The terminal of claim 16, wherein a width of the first elastic member remains unchanged or gradually decreases in a direction from the first base plate to the first support member.

18. The terminal of claim 1, wherein a width of the first elastic member remains unchanged or gradually decreases in a direction from the first base plate to the first support member.

19. The terminal of claim 1, wherein the first elastic member is a rubber member or a silicone member.

20. The terminal of claim 1, wherein the second support portion comprises:
- a second support member that is rotatably connected to the rotating mechanism;
- a second base plate that is laminated with the second support member; and
- a second elastic member connected between the first base plate and the first support member, wherein the second elastic member is elastically deformable to enable the second base plate to move in a direction toward or away from the rotating mechanism with respect to the second support member.

* * * * *